United States Patent [19]
Bascobert

[11] Patent Number: 6,138,463
[45] Date of Patent: Oct. 31, 2000

[54] CONTROL SYSTEM FOR MOBILE AIR CONDITIONING APPARATUS

[76] Inventor: Rene F Bascobert, 159 Woonmere Dr., Town of Tonawanda, N.Y. 14150

[21] Appl. No.: 09/504,682

[22] Filed: Feb. 15, 2000

Related U.S. Application Data

[63] Continuation of application No. 09/024,009, Feb. 14, 1998, Pat. No. 6,029,465.

[51] Int. Cl.[7] ..................................................... F25D 21/06
[52] U.S. Cl. ................................ 62/151; 62/158; 62/131; 62/228.3
[58] Field of Search .......................... 62/158, 227, 228.3, 62/228.1, 229, 157, 231, 151, 150, 323.4, 140, 128, 131

[56] References Cited

U.S. PATENT DOCUMENTS

| | | | |
|---|---|---|---|
| 3,636,369 | 1/1972 | Harter | 62/158 X |
| 3,707,661 | 12/1972 | King | 62/158 X |
| 3,708,998 | 1/1973 | Scherer et al. | 62/210 |
| 3,738,119 | 6/1973 | Scherer et la. | 62/217 |
| 4,602,484 | 7/1986 | Bendikson | 62/228.3 X |
| 5,243,829 | 9/1993 | Bessler | 62/131 X |

*Primary Examiner*—Harry B. Tanner

[57] ABSTRACT

A control system for mobile air conditioning systems for controlling the rate at which the system compressor or clutch is cycled between operational and decreased refrigerant flow, by selectively controlling the response time of certain system control signals to flow demand changes including de-icing control, from interactions between de-icing control and flow control valves, as well as system overall control. Upon the detection of an icing condition, the response of the control system is delayed to a degree to control the rate at which the capacity of the compressor can be cycled with in design limits. The delay feature allows the differential used in differentiating between icing and non-icing conditions to be significantly reduced over that required in the prior art and thereby improving the performance of the air conditioning system. Icing conditions, or the likelihood thereof, can be determined by sensing the condition of the refrigerant flow from the evaporator. In addition, the history of compressor cycling can be stored and used to prevent excessive cycling for any reason.

23 Claims, 8 Drawing Sheets

CONTROL SYSTEM FOR MOBILE AIR CONDITIONING APPARATUS

This is a continuation of application Ser. No. 09/204,009 filed Feb. 14, 1998, now U.S. Pat. No. 6,029,465.

FIELD OF THE INVENTION

This invention pertains to mobile air conditioning systems controls for controlling compressor cycling in general, and more particularly while in the evaporator de-icing mode, for increased system performance.

BACKGROUND OF THE INVENTION

The design criterion of mobile air conditioning systems requires that the air conditioning systems be designed to operate as efficiently as possible over a wide variety of environmental and operating conditions in a manner so as not detrimentally impact the capability of the equipment to properly perform, particularly the compressor or its clutch, as environmental and operation conditions change. One of the demands on operation of the compressor or its clutch is created by mobile air conditioning systems evaporator de-icing control. Evaporator icing is caused when the evaporator temperature is dropped to a level, that when air is blown through the evaporator, the humidity in the air causes ice crystals to form on the fins and tubing within the evaporator. If this continues for an extended period of time, the ice so formed will impede the flow of air through the evaporator, reducing the cooling capacity of the air conditioning system, and in the extreme, if sufficiently entirely iced over, essentially cutting off most of the air flow, thereby effectively incapacitating the air conditioning system.

The mobile air conditioning systems of the prior art, such as, those included in automobiles, trucks, busses, etc., presently include a temperature or pressure sensor at the output of the evaporator to detect when the evaporator is operating at a condition that is likely to cause icing. When the icing condition is sensed, the sensor reduces the compressor refrigerant flow capacity by operating a clutch relay, or switch, to deactivate the compressor clutch and thereby stop refrigerant flow until the sensor detects the selected non-icing condition. Such mobile air conditioning systems are usually driven by the vehicle engine through an electrically operated clutch. The clutch is initially activated when the air conditioning system is turned on, and then turned on and off by the vehicle air conditioning system temperature control system to maintain the vehicle at the desired temperature. In the later vehicle models, the evaporator icing sensor is connected to a vehicle computer that controls the activation and deactivation of the clutch.

It has been found that the higher the humidity of the atmosphere, more likely that icing can occur in the evaporator. Hence, mobile air conditioning systems are more susceptible to icing in the more humid, locations, which can be considered as the "worse case" for design purposes. As in most mechanical devices, mobile air conditioning system clutches have design limits as to the number of times the clutch can be cycled on and off over a period of time without causing deterioration or break down. In the case of automobile air conditioning systems, it is recommended that the compressor clutch should cycle on and off no more than six times a minute. Hence, it is important that the design of mobile air conditioning systems operates efficiently over a wide range of environmental and operating conditions, without evaporator icing, and without causing excessive cycling of the compressor clutch.

The present approach of the prior art to maintain a balance between evaporator deicing control and compressor cycle rate is to include a large differential in the icing detector sensor between selected non-icing and icing conditions. The large sensor differential was selected was that needed for worse case conditions (i.e. expected worse case humidity, temperature, etc. conditions). The sensor was set so that the selected large differential, along with the response time of the air conditioning system, assures that deicing system clutch cycling demands are within recommended cycling design limits at worse case conditions. For example, in some models of automobiles the icing condition is selected at 25 psi., while the non-icing condition is selected at 45 psi. (system reset condition), a significant differential of 20 psi. Although this arrangement was found to be a satisfactory to prevent evaporator icing in mobile air conditioning systems for worse case conditions, this large differential penalizes the performance of the air conditioning system in other than worse case conditions by keeping the compressor in the off condition over a wider range of the temperatures than needed. For example, if the compressor is shut off at the icing condition of 25 psi., the entire air conditioning system remains shut off until the preset differential high limit of 45 psi. is reached, a significant dead time required for the worst case operation. Since such large differential was selected for the worse case condition, the same large differential exists for all other operating conditions, despite the fact that the large differential is not needed and thereby unnecessarily detrimentally impacts the performance of the system under the large majority of operating conditions by keeping the system shut down longer than needed. It would therefor be advantageous if the differential detection range between the icing and non-icing conditions could be reduced to improve the overall performance of the air conditioning system while still not exceeding the recommended clutch cycling rate.

Further, the use of a pressure sensing compressor clutch deactivating system of the prior art was found to be undesirable in mobile air conditioning systems using a temperature sensitive refrigerant control valve (that controls the refrigerant flow through the system). Such temperature sensitive control valves are connected in the output line of the evaporator to detect the evaporator output temperature and control the system refrigerant flow as a function of evaporator output superheat. The temperature sensing mechanism of the control valve is inherently slow in its reaction both in its refrigerant flow restricting and increasing flow modes. With a pressure sensing evaporator icing control included in such system, it was found that when the control valve cuts back refrigerant flow and an icing condition is simultaneously sensed, the combination of the response times of the operation of the valve and the icing control system interact to cause the compressor clutch to rapidly cycle off and on several times before the system is stabilized. This clutch cycling not only is detrimental to the life of the clutch but was found to be annoying to the vehicle operator. It would therefor be advantageous to be able to include an evaporator deicing control system in a mobile air conditioning systems using a temperature controlled control valves that would be operable in such systems and still avoid the repetitive cycling of the compressor clutch due to valve and icing system interaction.

It is therefor an object of this invention to provide a new and improved compressor flow control arrangement for controlling compressor or clutch cycling in mobile air conditioning systems that provides for the use of the evaporator de-icing control arrangement that has a significantly reduced range between icing and non-icing determinations to thereby improve the overall system performance while maintaining compressor clutch cycling within design limits.

BRIEF DESCRIPTION OF THE INVENTION

In accordance with the invention, the response times in a mobile air conditioning system are changed for controlling the rate at which the system responds to refrigerant flow demands due to evaporator deicing control, so as to interact with refrigerant flow control valves and de-icing control, as well as system control, in a manner so as to control the rate at which the compressor refrigerant flow capacity can be cycled on and off for icing control, while increasing overall system performance by allowing for a reduced differentials between icing and non-icing determinations. The icing and non-icing determinations can be made by sensors that are connected adjacent to the evaporator to sense refrigerant temperature or pressure.

DETAILED DESCRIPTION OF THE INVENTION

Figure 1:
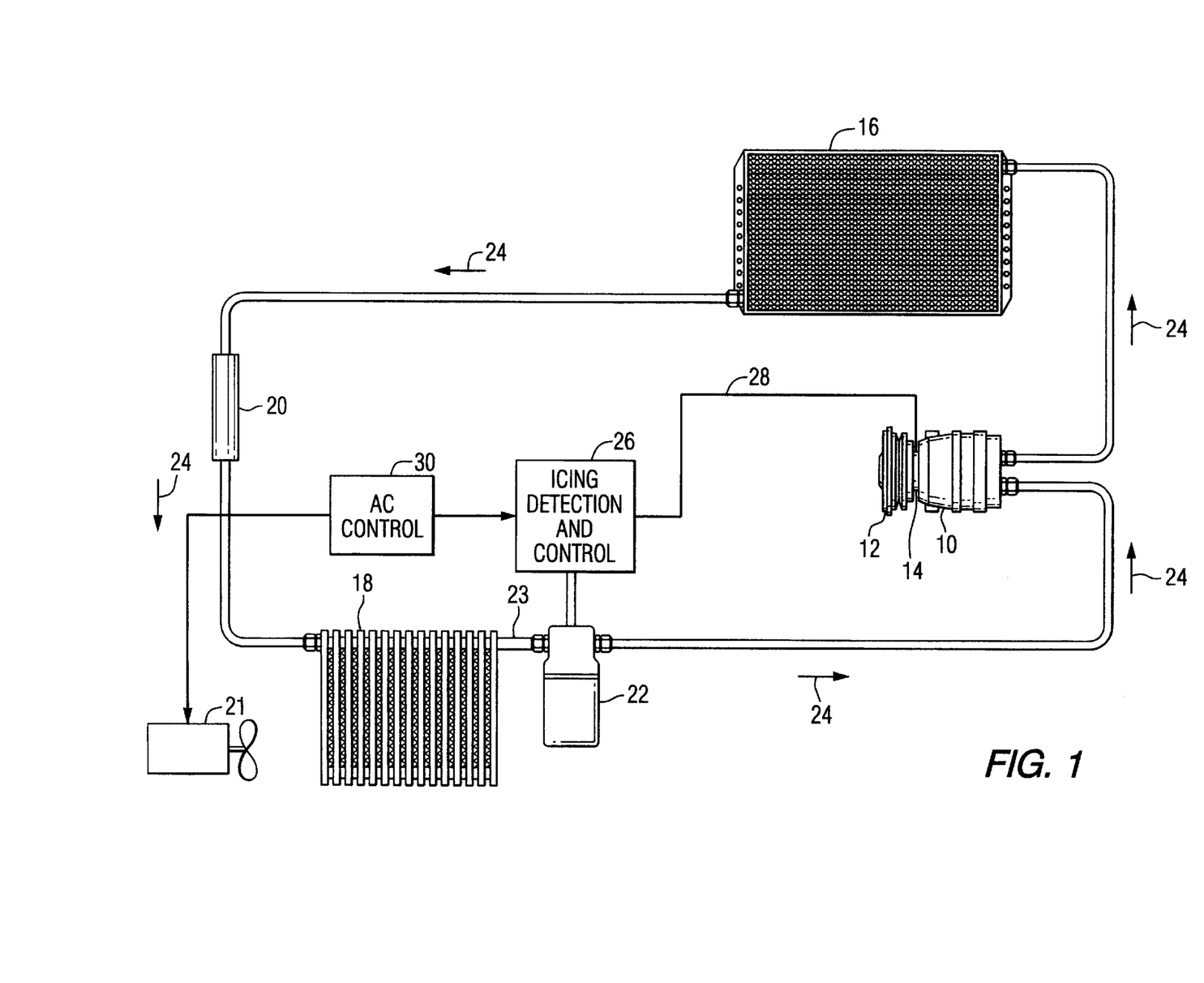
FIG. 1 is a schematic diagram of an orifice type of mobile air conditioning system including the evaporator icing control system of the invention.

The mobile air conditioning system of FIG. 1 includes a compressor 10 that is coupled to be driven by the vehicle engine (not shown) that powers both the vehicle and the mobile air conditioning system. In the case of an automobile air conditioning systems the compressor is usually driven by a belt coupling between the engine and the compressor pulley 12. The compressor 10 is driven via a clutch 14 when activated. The speed at which the compressor 10 is rotated is a function of the speed of rotation of the vehicle engine. Hence the higher the speed or rotation of the engine, the higher the speed of rotation of the compressor, and therefor the higher the capacity of the compressor to pump, refrigerant. The compressor 10 is turned on and off via the clutch 14 by the air conditioning system control system 30 as the need for air conditioning arises.

The direction of refrigerant flow through the system is illustrated by the arrows 24. A compressed high pressure gaseous refrigerant flows from the compressor 10 through a condenser 16. The purpose of the condenser 16 is to reject heat from the air conditioning system, while at the same time condenses the high pressure gaseous refrigerant into high pressure liquid refrigerant. Air flow through the condenser 16 absorbs heat from the refrigerant. In mobile air conditioning systems, the flow of air through the condenser 16 is variable and is controlled by the combination of the speed at which the vehicle is traveling, the speed at which the engine fan is rotating and the speed at which a condenser fan (not shown) is rotating, wherein the greater the air flow therethrough the greater the heat rejection, and visa versa.

The high pressure liquid refrigerant flows through an orifice 20, which is of a fixed size and restricts refrigerant flow through the air conditioning system and particularly the amount of refrigerant flow through the evaporator 18. Ideally a low temperature, all liquid refrigerant flow should enter the evaporator 18. The evaporator output 23 should be all vapor at the saturation temperature (boiling point). It is the boiling of the refrigerant within the evaporator 18 that causes heat absorption and provides the cooling effect of the evaporator 18. A blower 21 blows air through the evaporator 18 cooling the air as it passed through the evaporator providing for vehicle cooling. The speed control (not shown) for the blower 21 can be the existing multi-speed of variable speed types. As previously mentioned above, in certain environmental conditions that the vehicles are exposed to, particularly in high humidity, the evaporator 18 has a greater tendency to ice over. In addition, the high humidity along with vehicle speed and engine speed further increases the tendency for icing. This icing of the evaporator 18 may seriously impact the efficient flow of air through the evaporator and thereby detrimentally impact the system performance.

The refrigerant flows from the evaporator 18 through an accumulator 22 back to the compressor 10. If liquid refrigerant flows from the evaporator 18, the accumulator 22 will accumulate the liquid. If no liquid refrigerant flows from the evaporator 18, the accumulator 22 bleeds liquid refrigerant into the system. In effect the accumulator 22 controls the amount of active refrigerant charge in the system.

In accordance with the invention, an evaporator icing detection and control circuit 26 includes a sensor connected adjacent the output of the evaporator 18 to sense the operation of the evaporator 18 to determine if the evaporator 18 is likely to be in, or about to be, in an icing condition. The sensor of FIG. 1 is illustrated as located in the refrigerant flow line of the accumulator 22, however it can be located in the flow line 23 itself. The sensor can determine if the icing conditions are likely to be present through either, temperature or pressure measurements, although pressure is preferred due its inherent quicker response time by avoiding the thermal lag usually involved in temperature sensing. If a temperature sensor is to be used, the sensor could be alternatively placed within the evaporator 18.

As mentioned above, the mechanical limits of the clutch 14 are such that the clutch 14, or compressor, should only be cycled within its design limits or else be subject to deterioration or break down due to mechanical or electrical failures.

It was because of these design limits that the icing sensing system of the prior art included an evaporator sensor with an undesirable selected large differential gap between icing and non-icing signal levels for worst case cycling conditions. This large differential was selected to create a limit on the switching cycling rate that could be applied by the icing control system to the clutch 14 at worst case cycling conditions. Since the large sensor differential of the prior art was selected for the worse case cycling conditions, the same undesirable large differential limitations are applied to all other operating conditions (non-worse case) and therefor results in an associated overall loss in system performance where the large differential is not needed.

The limitations on system performance introduced by the undesirable large sensor differential of the prior art icing control systems are reduced, in accordance with the invention, by controlling the response time by which the clutch can respond to de-icing signals, by the introduction of off and/or on delays, control switching sequences etc. This introduction of controlled response times allows for a significant reduction in icing sensor differentials between icing and non-icing detection levels that can be used without exceeding clutch or compressor cycle limits. Hence, with a reduced icing and non-icing differential, the mobile air conditioning system will operate at improved performance for all operating conditions, while through the innovative use of controlled response times through delays or switching sequences excessive clutch cycling is avoided.

Figure 3:
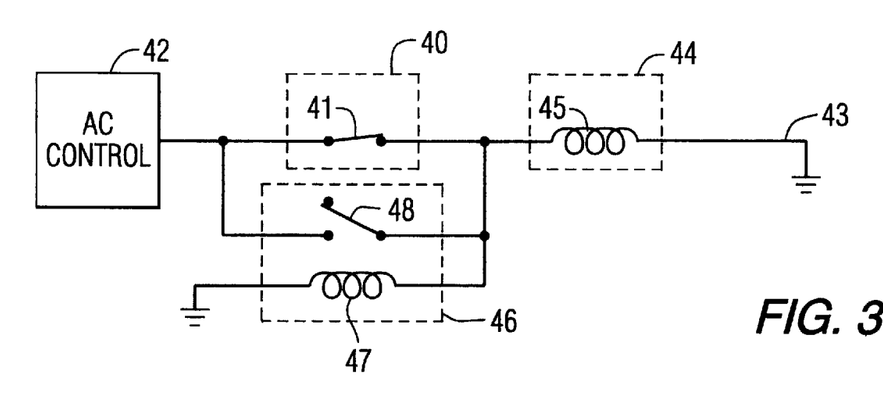
FIG. 3 is a first embodiment of an icing detection and control circuit for introducing a time delay, in accordance with the invention, into the deactivation of the clutch in response to sensor evaporator icing signals, wherein the sensor is connected directly in the clutch circuit and a time delay relay contacts are connected in parallel to the sensor.
Figure 4:
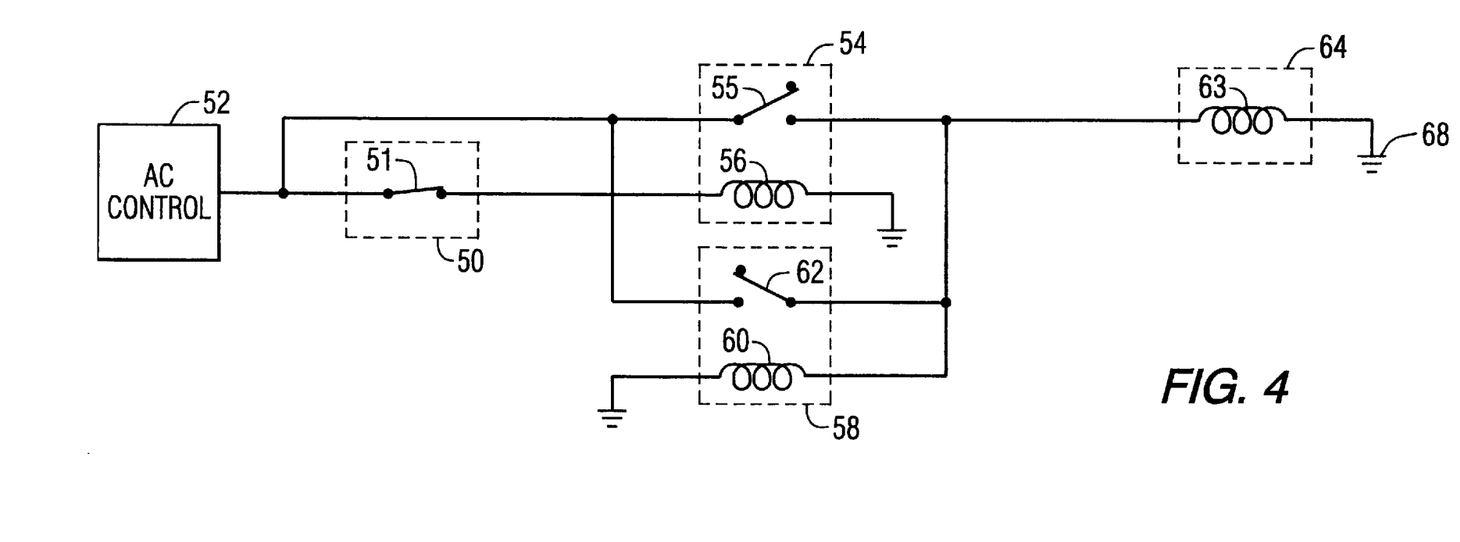
FIG. 4 is a second embodiment of an icing detection and control circuit for introducing a time delay, in accordance with the invention, into the deactivation of the clutch in response to the sensor evaporator icing signals, wherein the sensor is connected series with a clutch actuating relay that includes a time delay relay by pass circuit.
Figure 5:
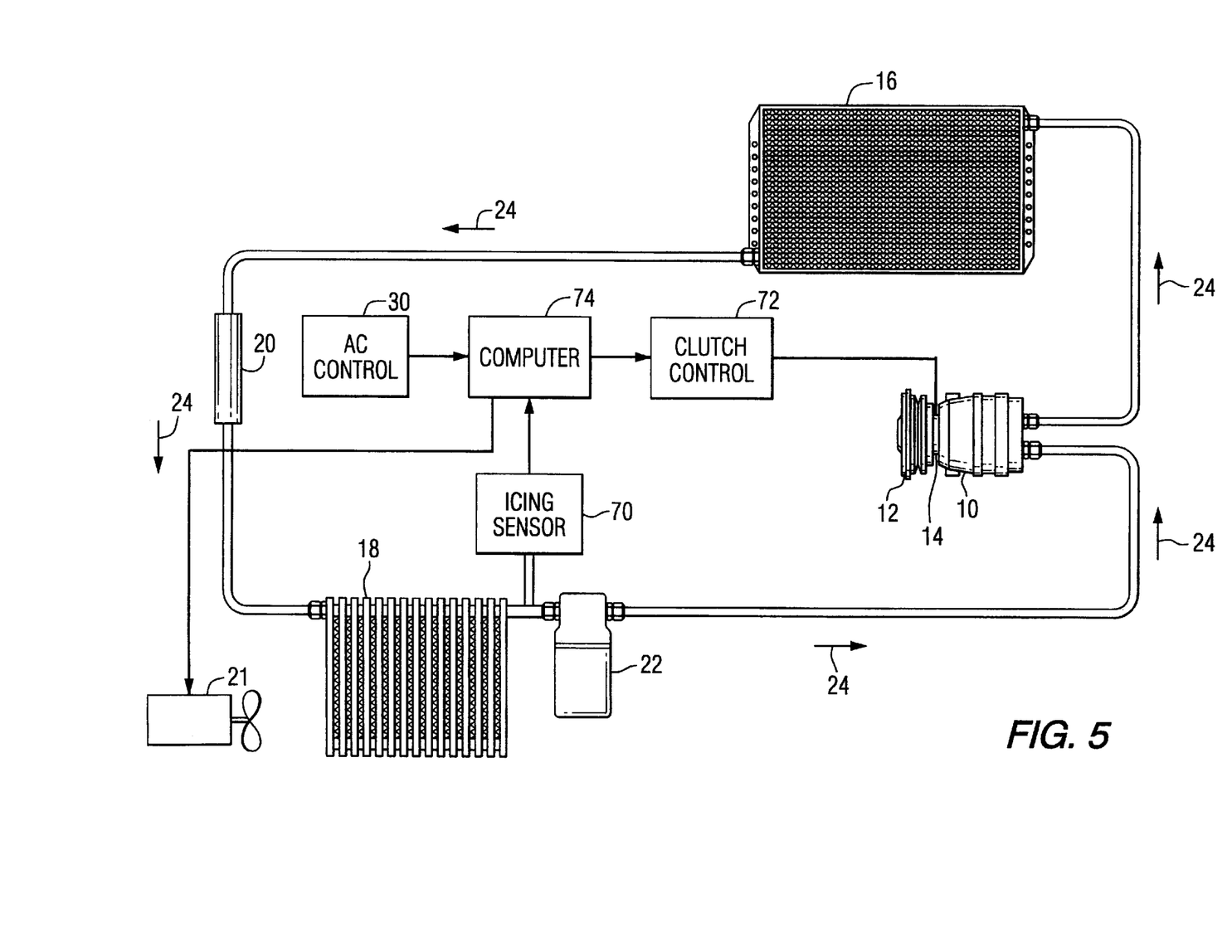
FIG. 5 includes a schematic diagram of another embodiment of an orifice type mobile air conditioning system having a computer to control the air conditioning system and including the evaporator icing control system of the invention.
Figure 6:
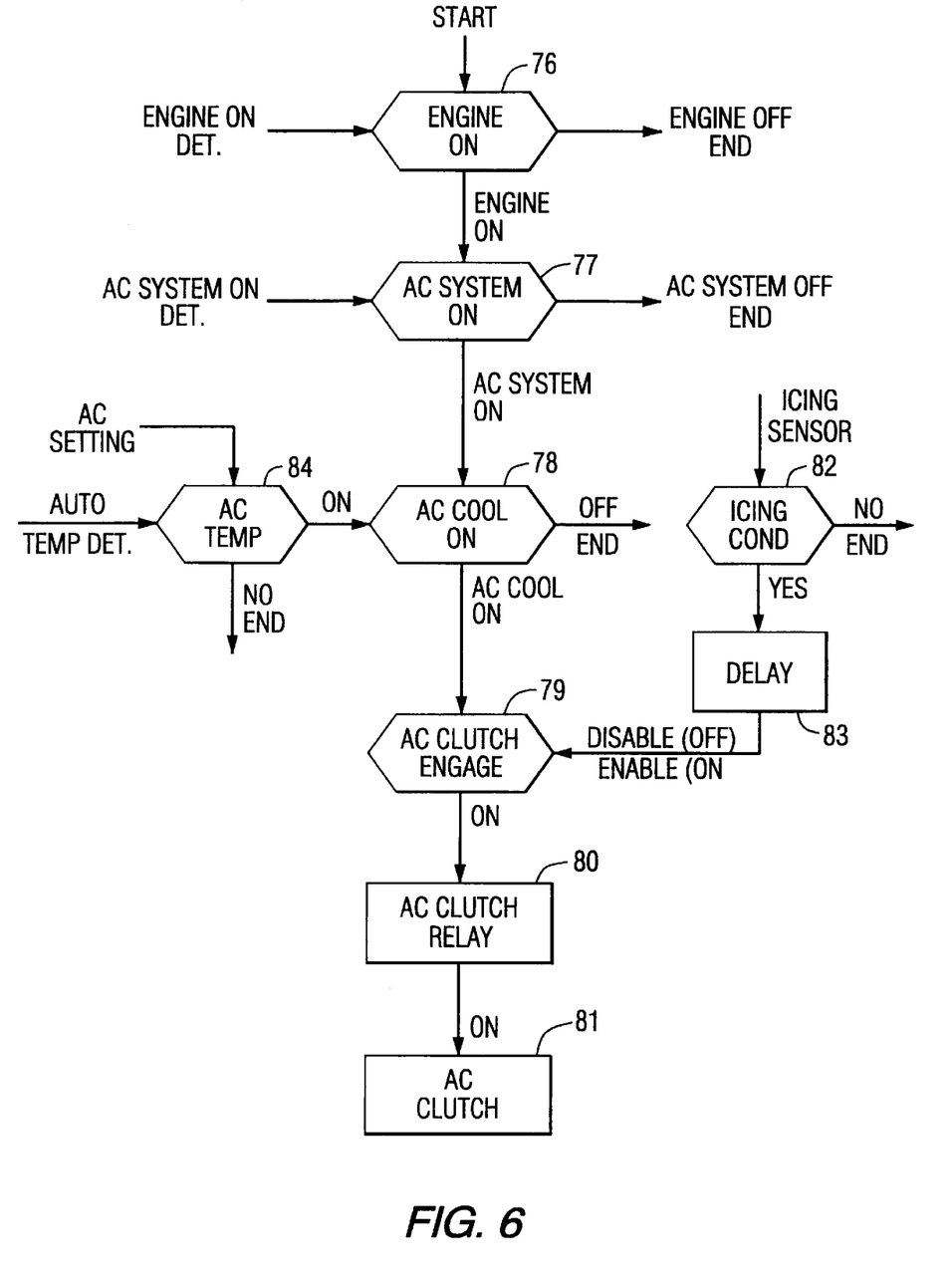
FIG. 6 includes a flow diagram for modifying the software in the computer of FIG. 5 to include the delay of the icing control system of the invention.

The icing detection and control circuit 26 of FIG. 1 is connected in series between the air conditioning system control circuit 30 and the compressor clutch 14 circuit The icing detection and control circuit 26 can include a sensor with a built in mechanical delay, or the delay can be created electrically as illustrated in FIGS. 3 and 4, or electronically, or by computer programming as illustrated in FIGS. 5 and 6. Whenever the sensor detects an icing condition, a delay period is created during which time the compressor clutch 14 can not be deactivated, or activated, by the icing sensor.

In accordance with one embodiment, after the delay period has run, the icing detection and control circuit 26 opens the connection to the clutch and the clutch is deactivated and the flow of refrigerant is cut off until the non-icing condition is detected. When the non-icing condition situation is detected by the sensor and after the delay has run, the circuit to the clutch 14 is again closed via the icing detection and control circuit 26 and the refrigerant flow is reactivated by the compressor 10 under the control of the air conditioning control circuit 30. In accordance with another embodiment the clutch could be immediately deactivated with its reactivation delayed. Hence, it now can be seen, that according to the invention, the limit for cycling the clutch can be controlled by a delay and now a smaller sensor differential can now be used to distinguish between the icing and non-icing modes. By reducing the icing sensor differential, the designated lower level of non-icing condition is detected sooner. This in turn provides for a shorter period of system operation down time (a shorter period of time during which the refrigerant flow is interrupted) and therefor a correspondingly better the system performance. Therefor, in accordance with the invention, it can be seen the penalty that accompanied the undesirable large sensor differential of the prior art (set by worst case driving conditions) can now be significantly reduced while still safeguarding the cyclic operation of the clutch 14 by the use of a delaying action and/or switching sequences.

For the purpose of simplifying the explanation of the invention, in FIGS. 1, 2, 5 and 8 the same elements in each of these Figures will have the same references numerals. The mobile air conditioning system of FIG. 2 includes a temperature sensing control valve 32 instead of the orifice 20. The valve 32 detects the temperature of the refrigerant flow from the evaporator 18 to control the refrigerant flow through the air conditioning system. The evaporator icing detection and control circuit 26 is located in the flow line 37 before the valve 32, but could be located after the valve 32, or if a temperature sensor is used, within the evaporator 18. The icing sensor circuit 26 functions in the same manner as described with regard to FIG. 1.

Figure 2:
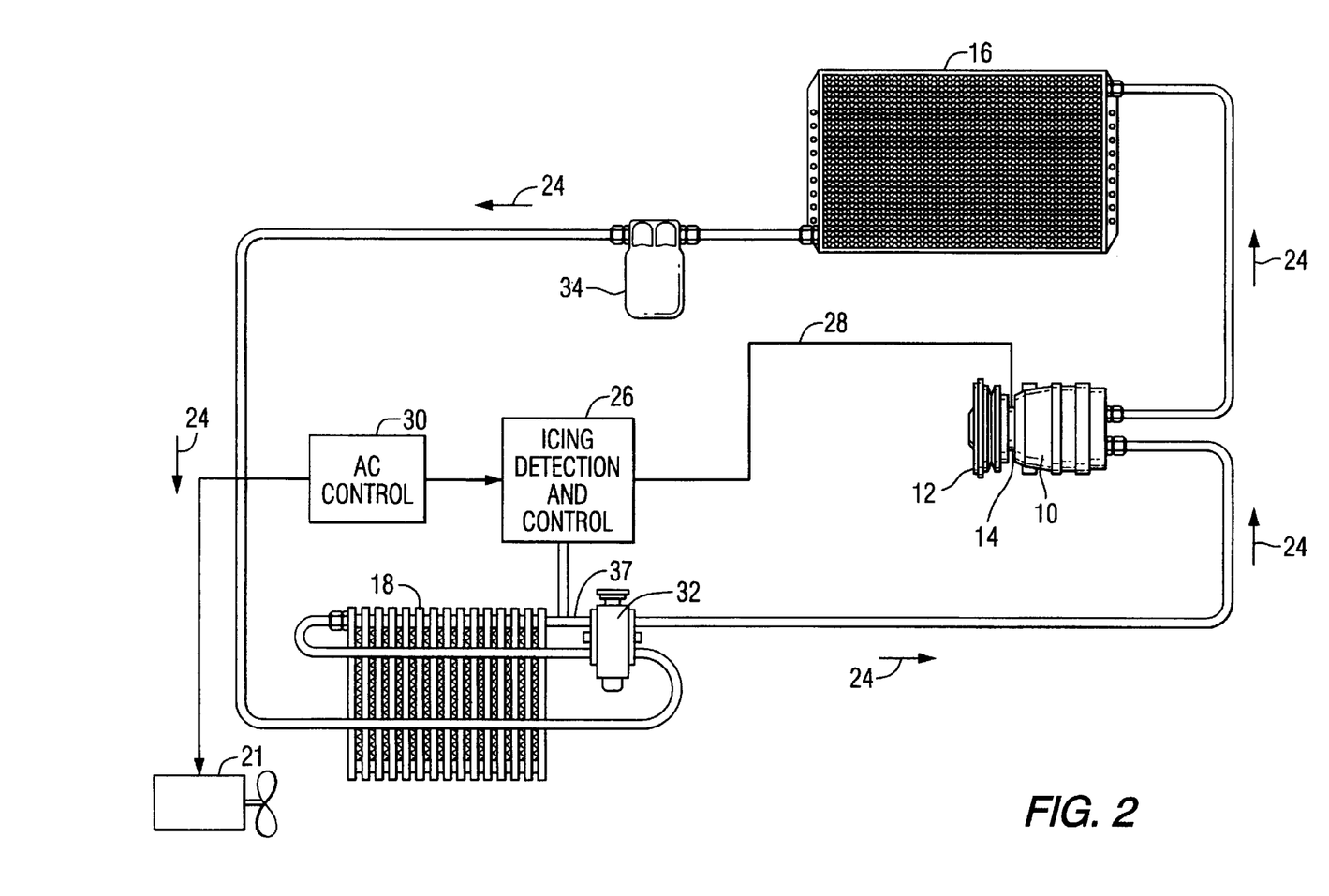
FIG. 2 is a schematic diagram of a temperature sensing control valve type of mobile air conditioning system including the evaporator icing control system of the invention.

FIG. 3 includes a first embodiment the an icing detection and control circuit 26 for use in FIGS. 1 and 2. A set of normally closed contacts 41 of the icing sensor 40 are connected in series between the air conditioning system control 30 and the clutch 44 coil 45 to ground 43. A coil 47 of a delay relay 46 is connected between the contacts 41 and the coil 45 and ground. The normally open contacts 48 of the time delay relay 46 are connected across the sensor contacts 41. The delay relay 46 is of the type that continues in the activated condition for a preset period of time after being de-energized. In the non-icing mode, the sensor contacts 41 are closed allowing the clutch coil 45 to be energized by the air conditioning control 30 and the time delay relay coil 47 is also energized to close contacts 48. When the sensor 40 detects an icing condition the contacts 41 open. However, the contacts 48 of the time delay relay 46 remain closed and by pass the sensor contacts 41 for a preset period of the time delay. When the delay period of time has expired, the contacts 48 open and the clutch coil 45 is de-energized to shut off the compressor. The period of delay time selected for the relay 46 is of a duration to keep the sensor contacts 41 by passed by the contacts 48 so that the clutch 14 can not be cycled by the sensor contacts 41 beyond its design limits. With the clutch 14 disengaged, the flow of refrigerant ceases allowing the evaporator to warm up. When the sensor 40 detects the selected non-icing condition, the contacts 41 are closed to energize the clutch coil 45 and restart the flow of refrigerant, while also simultaneously energizing the time delay relay 46. If the sensor contacts 41 close before the delay time of the relay 46 has expired, the delay relay 46 is re-energized and the clutch 14 remains continuously energized for an uninterrupted flow of refrigerant.

FIG. 4 includes second embodiment of an icing detection and control circuit 26 for use with FIGS. 1 and 2. A power relay 54 is connected in series with the sensor 50 normally closed contacts 51. The relay 54 coil 56 is actuated and de-actuated in response to the closing and opening of the sensor contacts 51. The power relay normally open contacts 55 are connected between the system control 52 and the clutch 64 coil 63. The circuit of FIG. 4 has the advantage of removing the sensor contacts 51 out of the high current clutch coil 64 circuit. In FIG. 4 the time delay relay 58 coil 60 is energized whenever the relay 54 is energized and the normally open contacts 62 are connected in parallel to the power relay contacts 55. Whenever the contacts 51 are opened due to the detection of an icing condition, the relay 54 is opened, but the contacts 62 continue to by pass the contacts 55 for the time delay of the time delay relay 58 preventing the de-energization of the clutch coil 63 during the time delay period. When the sensor 50 detects the preset non-icing condition, the contacts 51 are closed to energize the relay 58, the delay relay 46 and the clutch coil 60.

Although the circuits of FIGS. 3 and 5 provide an arrangement wherein there is a time delay introduced before the clutch can be deactivated, it should be understood that the circuits can be modified so that the clutch coil can be immediately deactivated and a time delay introduced before the clutch could be reactivated.

Although the electrical control circuits of FIGS. 3 and 4 disclose the concept of inserting delays into the air conditioning system control with the use of sensor switch contacts and relays, it should be understood that the icing detection and control circuit 26 could as well be embodied with the use of well known solid state detectors, delay circuits and switching devices. With the added use of computers in mobile air conditioning systems, the vehicle computer that controls the overall operation of the air conditioning system, including the evaporator icing control for the system, can be used, in accordance with the invention, to improve the performance of the system by providing the delaying action for limiting the rate at which the compressor clutch 14 can be cycled on and off.

As illustrated in FIG. 5, the vehicle computer 74 of the prior art receives signals from the air conditioning control 30 to control the operation of the air conditioning system, and receives icing condition signals from an evaporator icing sensor 70. In accordance to the invention, the portion of the prior art computer software in the computer 74 pertaining to the energization of the clutch 14, via the clutch control circuit 72, is modified to insert time response control for limiting the cycle rate at which the clutch 14 can be turned on and off. For example, instead of responding to the icing signal from sensor 70 to immediately de-energize the clutch 14 (as done in the prior art), the computer 74 is programmed to introduce a delay time to prevent the clutch 14 from being de-activated until the delay period has run, or alternatively to program the computer 74 to immediately de-energize the clutch and to delay the re-activation of the clutch.

The flow diagram of FIG. 6 includes a modification of the computer 74 software to include the time response control concept of the invention. The first step 76 of the process determines if the vehicle engine is running, while the second step 77 determines if the air conditioning system is turned on. Step 78 determines if there is a request for air conditioning from step 84 (which compares the air conditioning temperature setting with the internal vehicle temperature). If there is a request for air conditioning, the step 78 enables the clutch engage step 79 to enable the clutch relay 80 to engage the clutch 81. However if an icing condition is determined by step 82, instead of its output being directly applied to disable the clutch (as done in the prior art, a delay step 83) is included between steps 79 and 82. The delay can be an off delay as in FIGS. 3 and 4, or can be an on delay wherein the step 79 is immediately disabled and a delay is inserted in engaging the clutch. The delay is that needed to keep the clutch from cycling beyond designated limits.

Figure 7:
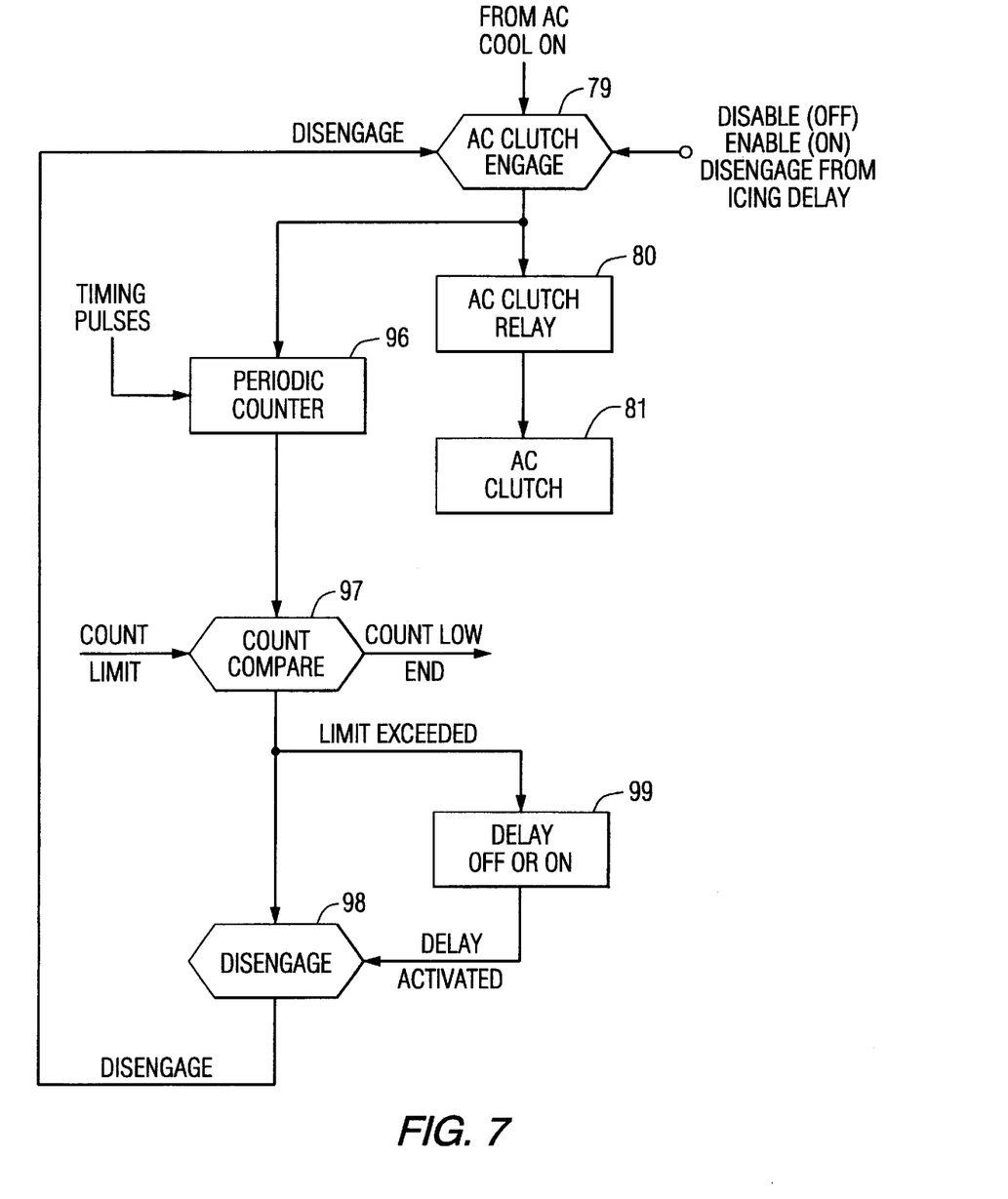
FIG. 7 includes a flow diagram for modifying the software in the computer of FIG. 5 to include an overall clutch cycle control feature of the invention.

The flow diagram of FIG. 7 includes a modification of the flow diagram of FIG. 6 that includes an overall clutch cycle control feature. The step 96 continually counts the rate at which the clutch is cycled in general, and the cycle rate is compared with a preset limit by the step 97. If the preset limit is exceeded, the step 97 applies a limit exceeded indication to the disengage step 98 and to the delay step 99. The delay step 99 can be an off delay or an on delay. If an off delay is used, then the arrangement is such that the disengage step 98 applies a disengage designation to the clutch engage step 79 after the delay of step 99 has run. If an on delay is used then the step 98 applies the disengage immediately upon receipt of the limit exceeded status and can be re-engaged after the delay of step 99 has run. The duration of the delay is that needed to keep the clutch cycle rate within design limits.

Figure 8:
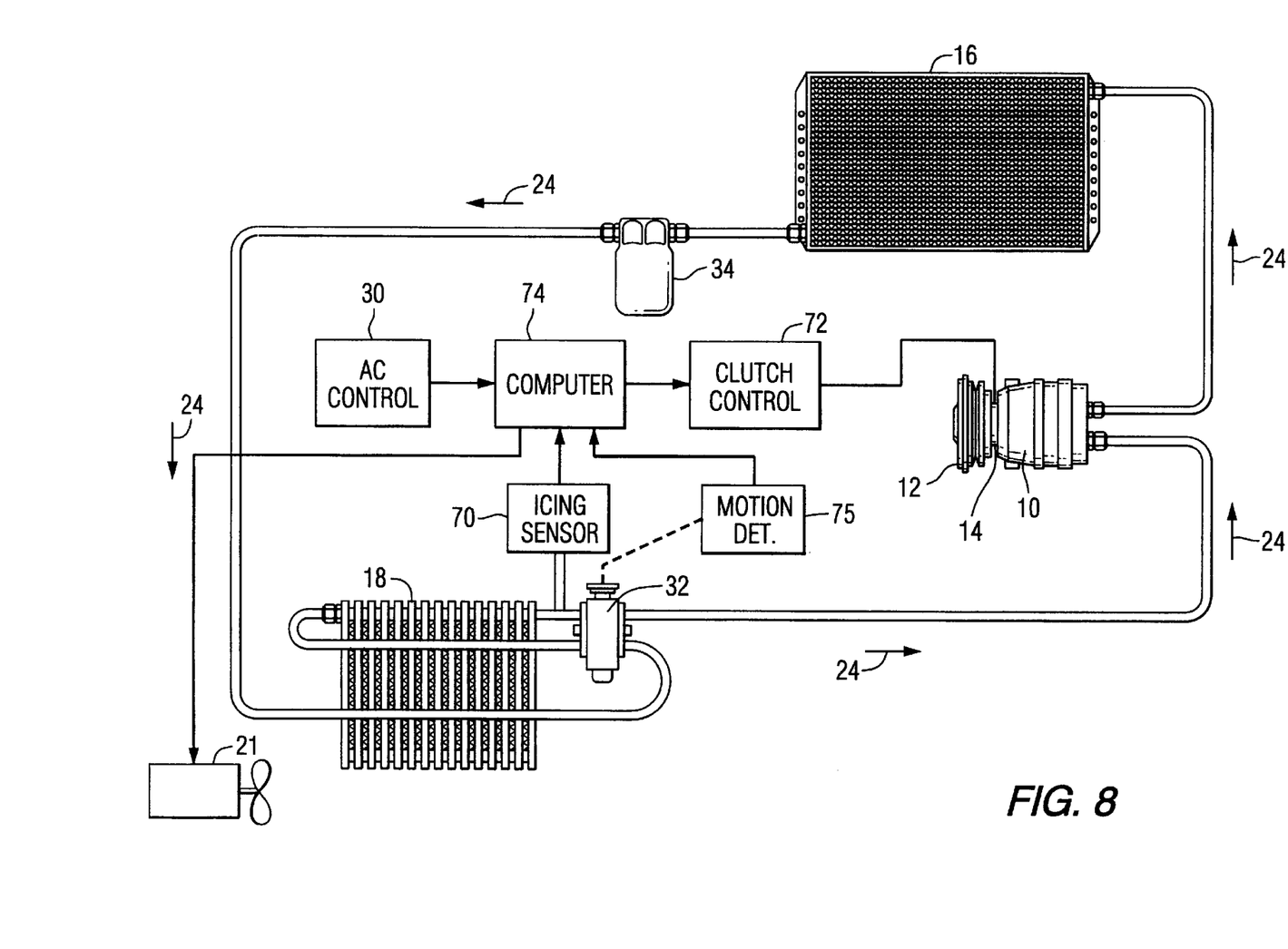
FIG. 8 includes a schematic diagram of another embodiment of a temperature sensing valve controlled type mobile air conditioning system having a computer to control the air conditioning system and including the evaporator icing control system of the invention.

In accordance with FIG. 8, the vehicle computer 74 has been programmed to function in the same manner in response to icing signals from sensor 70 as in FIG. 5. However, the computer 74 is also programmed to be responsive to signals from a motion detector 75 to detect the operation of the temperature sensitive control valve 32 to prevent the repetitive cycling of the clutch 14 due to the interaction of icing control and valve flow control as mentioned above. The motion detector 75 is coupled to the temperature sensitive control valve 32 to detect valve motions of magnitudes that might cause the interactive cycling. The program of the computer 74 is modified to temporarily inhibit the computer 74 from acting on the icing signals from the sensor 70 during the motion of the valve 32 that might have other wise interacted with the icing control caused the repetitive clutch cycling.

Figure 9:
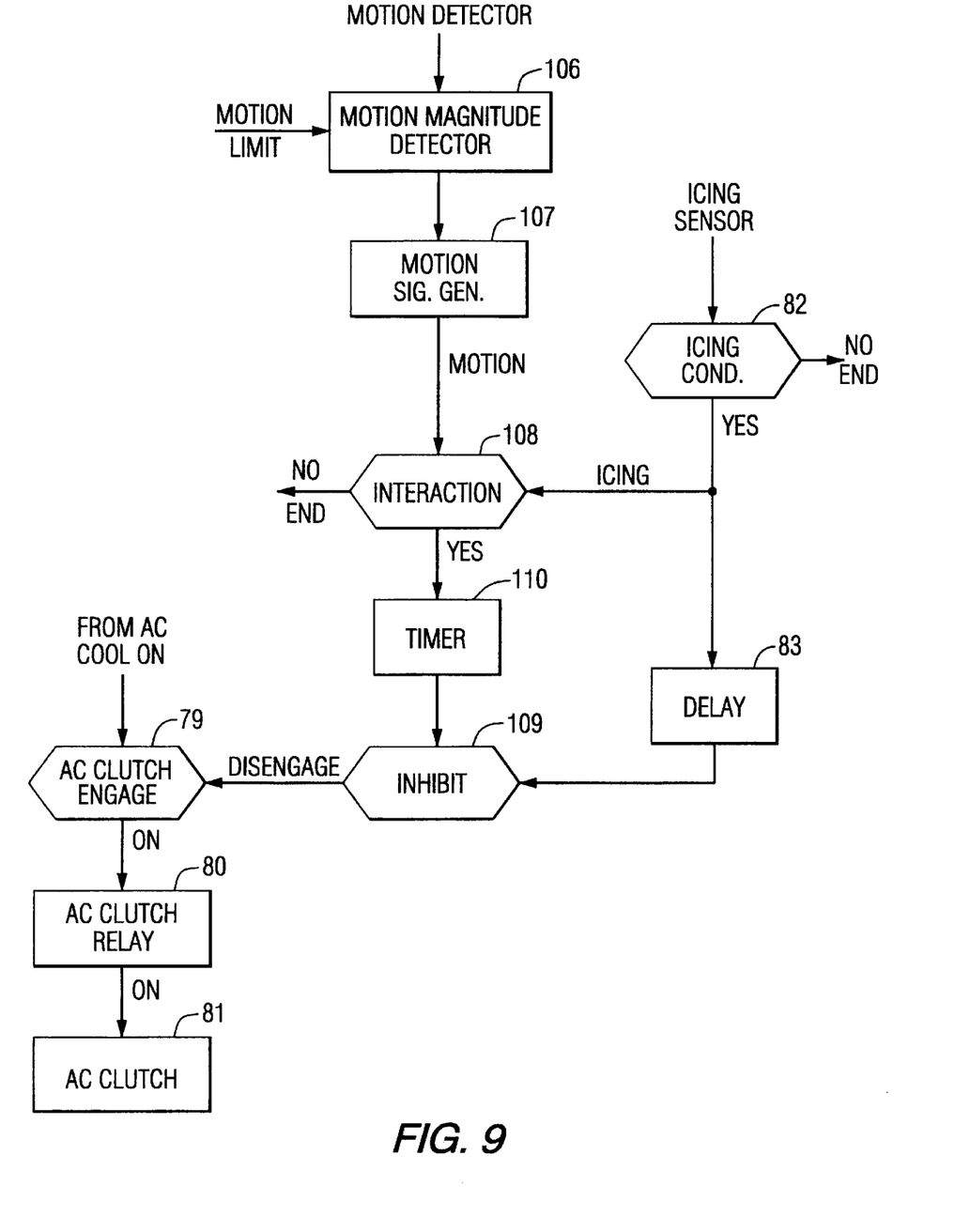
FIG. 9 includes a flow diagram for modifying the software in a computer of FIG. 8 to include a valve motion detection in the icing control system of the invention.

The flow diagram of FIG. 9 includes a modification of the software of the computer 74 of FIGS. 6 and 8 so as to reduce the cyclic interaction between the temperature controlled valve 32 and the icing sensor 70. The motion magnitude step 106 determines when the motion temperature controlled valve 32 exceeds predetermined limits and enables the motion signal generator step 107 to apply a motion designation to the interaction step 108. The interaction step 108 also receives an icing designation from the icing condition step 82. When both the icing and motion designations are present, the output of step 108 enables the inhibit step 109 to inhibit the application of the icing condition control until the motion of the temperature controlled valve motion is within limits to minimize the interaction mentioned above.

As described above, in accordance with the invention, a delay is inserted in the clutch control circuit for controlling the clutch cycle rate instead of the inefficient use of the large sensor differential of the prior art. The delay can be set for 10 seconds so as not to exceed the design recommendation of a maximum of 6 clutch cycles per minute. Under normal conditions (non-worse case conditions) with the likelihood of excessive clutch cycling decreasing, the sensor icing-non icing differential can be significantly decreased, which in turn reduces system dead time resulting in a corresponding improvement in system performance.

In more sophisticated systems using computers by which the operation of the clutch is controlled, the invention can be simply installed by replacing the prior art icing sensor with a sensor with a smaller differential and by programming the delay into the computer. The computer can have the added advantage of accumulating data as to the periodic and cyclic operation of the clutch, and if history allows, only insert the delay when required.

What is claimed:

1. In a mobile air conditioning system including a compressor controlled by an air conditioning system control system including a computer, and a condenser, and an evaporator, an evaporator icing control system comprising:
   at least one sensor for monitoring the operation of the evaporator to provide one signal when a determination is made that the evaporator is likely in an icing condition and another signal when a determination is made that the evaporator is in a non-icing condition;
   circuit means coupling the sensor to the computer so as to be responsive to the signals from the sensor so that the computer reduces the flow capacity of the compressor when the icing condition is determined, and resets the flow capacity of the compressor when the non-icing condition is determined, and wherein the response of the computer is slower in reacting to one of the sensor signals than the other.

2. An evaporator icing control system as defined in claim 1 wherein:

the frequency of cycling the compressor between reduced capacity and reset capacity is controlled within preset compressor cycle limits is determined by the response of the computer to the sensor signals.

3. An evaporator icing control system as defined in claim 1 wherein:

the computer reduces and resets the compressor flow by turning the compressor on and off.

4. An evaporator icing control system as defined in claim 3 wherein:

the compressor includes a clutch, and the computer turns the compressor clutch on and off.

5. An evaporator icing control system as defined in claim 1 wherein:

the computer response to an icing signal is delayed.

6. An evaporator icing control system as defined in claim 1 wherein:

the computer response to a non-icing signal is delayed.

7. An evaporator icing control system as defined in claim 6 wherein:

the air conditioning system includes a flow control valve including a movable valve mechanism for controlling refrigerant flow;

a detection circuit is coupled to the valve for monitoring the movements of the valve mechanism for providing movement signals that are a function of the valve mechanism movement, and a computerized program monitors the movement signals so as to inhibit the computer from changing flow capacity during valve mechanism movements beyond preset limits.

8. In a mobile air conditioning systems that includes a compressor, a condenser, a flow controller, a condenser, and an evaporator, a control system including a computer for controlling the operation of the air conditioning system comprising:

computerized program temperature control for comparing the difference between the vehicle compartment temperature with compartment temperature control setting and being responsive to evaporator icing and non-icing determinations, for controlling compressor flow capacity, and computerized program control for monitoring the rate the compressor flow capacity is changed due to compartment temperatures and evaporator icing and non-icing determinations so as to control the rate at which the compressor flow rate can be cycled.

9. A control system as defined in claim 8 includes:

an evaporator de-icing sensor that monitors the operation of the evaporator so as to provide an first signal when an evaporator icing condition is determined and a second signal when a non-icing condition is determined, and the response of the computer is delayed to at least one of the first and second signals.

10. A control system as defined in claim 9 wherein:

the flow controller is a control valve including a movable valve mechanism for controlling refrigerant flow;

a detection circuit is coupled to the valve for detecting the movements of the valve mechanism for providing movement signals that are a function of the valve mechanism movement, and a computerized program monitors the movement signals so as to delay the response of the computer to change flow capacity for valve mechanism movements beyond preset limits.

11. A control system as defined in claim 8 wherein:

the frequency of cycling the compressor between reduced capacity and normal capacity is controlled within preset compressor cycle limits is determined by the response of the computer to the sensor signals.

12. A control system as defined in claim 8 wherein:

the computer reduces and resets the compressor flow by turning the compressor on and off.

13. A control system as defined in claim 12 wherein:

the compressor includes a clutch, and the computer turns the compressor clutch on and off.

14. A control system as defined in claim 8 wherein:

the computer response to an icing signal is delayed.

15. A control system as defined in claim 8 wherein:

the computer response to a non-icing signal is delayed.

16. In a mobile air conditioning system including a compressor controlled by an air conditioning system control system including a computer, and a condenser, an orifice device and an evaporator, an evaporator icing control system comprising:

a sensor for monitoring the operation of the evaporator to provide one signal when a determination is made that the evaporator is likely in an icing condition and another signal when a determination is made that the evaporator is in a non-icing condition, and circuit means coupling the sensor to the computer so as to be responsive to the signals from the sensor so that the computer reduces the flow capacity of the compressor when the icing condition is determined and resets the flow capacity of the compressor when the non-icing condition is determined, wherein the response time of the computer is slower in reacting to one of the signals than the other, the arrangement being such that the efficiency of the air conditioning system is adapted to be enhanced by the reduction of the differential between icing and non-icing determinations while controlling the rate at which the compressor is cycled between reduced flow and reset flow capacities by the response times of the computer.

17. An evaporator icing control system as defined in claim 16 wherein:

the orifice device is a variable control valve functioning as a variable orifice.

18. An evaporator icing control system as defined in claim 17 wherein:

the variable control valve includes a movable valve mechanism;

a detection circuit is coupled to the valve for detecting the movements of the valve mechanism for providing movement signals that are a function of the valve mechanism movement, and computer monitors the movement signals so as to delay the response of the computer to change compressor flow capacity for valve mechanism movements beyond preset limits.

19. An evaporator icing control system as defined in claim 16 wherein the computer compares the difference between the vehicle compartment temperature with compartment temperature control setting for controlling compressor flow capacity, and the computer monitors the rate the compressor flow capacity is changed due to compartment temperatures and evaporator icing and non-icing determinations so as to further control the rate at which the compressor flow rate can be cycled.

20. An evaporator icing control system as defined in claim 16 wherein:

the computer reduces and resets the compressor flow by turning the compressor on and off.

21. An evaporator icing control system as defined in claim 20 wherein:

the compressor includes a clutch, and the computer turns the compressor clutch on and off.

22. An evaporator icing control system as defined in claim 21 wherein:

the computer response time to an icing signal is slower than to a non-icing signal.

23. An evaporator icing control system as defined in claim 22 wherein:

the computer response time to a non-icing signal is slower than to an icing signal.

* * * * *